United States Patent
Morris

(10) Patent No.: US 11,373,521 B2
(45) Date of Patent: Jun. 28, 2022

(54) INTELLIGENT RIGHT OF WAY DETERMINATION FOR AUTONOMOUS VEHICLES

(71) Applicant: GM Cruise Holdings LLC, San Francisco, CA (US)

(72) Inventor: Kyle John Morris, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 245 days.

(21) Appl. No.: 16/219,764

(22) Filed: Dec. 13, 2018

(65) Prior Publication Data

US 2020/0193812 A1   Jun. 18, 2020

(51) Int. Cl.
| G08G 1/01 | (2006.01) |
| G08G 1/0967 | (2006.01) |
| G05D 1/00 | (2006.01) |
| G07C 5/00 | (2006.01) |
| G05D 1/02 | (2020.01) |

(52) U.S. Cl.
CPC ......... G08G 1/0145 (2013.01); G05D 1/0088 (2013.01); G05D 1/0276 (2013.01); G07C 5/008 (2013.01); G08G 1/0112 (2013.01); G08G 1/096725 (2013.01); *G05D 2201/0213* (2013.01)

(58) Field of Classification Search
CPC ............... G08G 1/0145; G08G 1/0112; G08G 1/096725; G05D 1/0088; G05D 1/0276; G05D 2201/0213; G07C 5/008
See application file for complete search history.

(56) References Cited

U.S. PATENT DOCUMENTS

| 9,459,623 | B1 * | 10/2016 | Raghu | G01S 13/931 |
| 9,818,299 | B1 * | 11/2017 | Jammoussi | B60W 30/18 |
| 10,083,547 | B1 | 9/2018 | Tomatsu | |
| 10,684,626 | B1 * | 6/2020 | Martin | G05D 1/0253 |
| 10,748,426 | B2 * | 8/2020 | Cazzoli | G01S 17/931 |
| 10,994,748 | B2 * | 5/2021 | Mortazavi | G06K 9/00791 |
| 2009/0109061 | A1 * | 4/2009 | McNew | G08G 1/164 340/928 |
| 2013/0018572 | A1 * | 1/2013 | Jang | G08G 1/164 701/119 |

(Continued)

*Primary Examiner* — Nadeem Odeh

(74) *Attorney, Agent, or Firm* — Calfee, Halter & Griswold LLP

(57) ABSTRACT

Various technologies described herein pertain to generating a bid for turn priority at an intersection. An autonomous vehicle determines that the autonomous vehicle and a second autonomous vehicle are proximate to an intersection. The autonomous vehicle generates a first bid that is indicative of a first importance that the autonomous vehicle traverses the intersection. The first bid is based upon characteristics of a trip of a passenger riding in the autonomous vehicle. The autonomous vehicle transmits the first bid to a networked computing system, wherein the networked computing system determines a turn order based upon the first bid and a second bid generated by the second autonomous vehicle. The networked computing system transmits the turn order to the autonomous vehicle, wherein the autonomous vehicle operates based upon the turn order.

20 Claims, 11 Drawing Sheets

(56) References Cited

U.S. PATENT DOCUMENTS

| | | | |
|---|---|---|---|
| 2016/0027299 A1* | 1/2016 | Raamot | G08G 1/0145 |
| | | | 340/917 |
| 2016/0179093 A1 | 6/2016 | Prokhorov | |
| 2018/0111617 A1 | 4/2018 | Stahl | |
| 2018/0122237 A1* | 5/2018 | Nascimento | G08G 1/0965 |
| 2018/0308354 A1* | 10/2018 | Li | G08G 1/096708 |
| 2018/0342033 A1 | 11/2018 | Kislovskiy et al. | |
| 2019/0019416 A1 | 1/2019 | Perko | |
| 2019/0035267 A1* | 1/2019 | Balzer | G08G 1/07 |
| 2019/0088135 A1* | 3/2019 | Do | G05D 1/0055 |
| 2019/0221116 A1* | 7/2019 | Powch | G08G 1/0112 |
| 2019/0318620 A1* | 10/2019 | Yang | G05D 1/0287 |
| 2020/0242922 A1* | 7/2020 | Dulberg | G08G 1/096783 |

\* cited by examiner

INTELLIGENT RIGHT OF WAY DETERMINATION FOR AUTONOMOUS VEHICLES

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others. The autonomous vehicle operates based upon sensor signals output by the various sensor systems.

The autonomous vehicle may utilize the sensor signals output by the sensor systems to aid in determining motion of the autonomous vehicle. Conventional motion planning techniques of autonomous vehicles tend to be computationally intensive and constrained to right of way rules of the road. For example, when the autonomous vehicle reaches an intersection along with a second vehicle, the autonomous vehicle utilizes the sensor signals generated by the sensor systems in order to determine whether the autonomous vehicle or the second vehicle has a right of way. For instance, the autonomous vehicle may give priority to the second vehicle at the intersection when the second vehicle arrives at the intersection prior the autonomous vehicle arriving at the intersection.

Conventional motion planning techniques of autonomous vehicles are associated with various deficiencies. First, conventional motion planning techniques tend to be computationally burdensome, as an autonomous vehicle typically processes a large amount of sensor signals generated by the sensor systems in order to determine whether the autonomous vehicle has priority at an intersection. Second, in certain scenarios, occlusions in driving environments may prevent the sensor systems of the autonomous vehicle from perceiving certain areas of a driving environment of the autonomous vehicle, which may negatively affect determining whether the autonomous vehicle has priority at the intersection. Third, conventional motion planning techniques rely upon conventional right of way rules of the road, which may not always be efficient or desirable, especially in driving environments in which many of the vehicles in the driving environment are autonomous vehicles.

SUMMARY

The following is a brief summary of subject matter that is described in greater detail herein. This summary is not intended to be limiting as to the scope of the claims.

Described herein are various technologies that pertain to controlling motion planning of an autonomous vehicle when the autonomous vehicle is at an intersection. With more specificity, described herein are various technologies pertaining to generating a bid for turn order priority for an autonomous vehicle located at an intersection.

According to various embodiments, an autonomous vehicle comprises a vehicle propulsion system, a braking system, a steering system, and a plurality of sensor systems. The plurality of sensor systems generate a plurality of sensor signals that are indicative of a driving environment of the autonomous vehicle. In an example, the driving environment includes an intersection (e.g., an intersection having a four-way stop sign) and a second autonomous vehicle. The autonomous vehicle further comprises a computing system that is in communication with the plurality of sensor systems, the vehicle propulsion system, the braking system, and the steering system.

In operation, it is contemplated that the autonomous vehicle and the second autonomous vehicle are approaching the intersection. The computing system of the autonomous vehicle can determine that the autonomous vehicle and the second autonomous vehicle are proximate to the intersection based upon the plurality of sensor signals. According to another example, it is contemplated that a networked computing system can determine that the autonomous vehicle and the second autonomous vehicle are proximate to the intersection.

The autonomous vehicle generates a first bid for turn priority at the intersection. The first bid is indicative of a first importance that the autonomous vehicle traverses the intersection. The first bid is based upon characteristics of a trip of a passenger riding in the autonomous vehicle. Alternatively, when the autonomous vehicle is not transporting a passenger, the first bid may be based solely on characteristics of a trip of the autonomous vehicle.

The characteristics of the trip of the passenger may include at least one of an intended path of the autonomous vehicle that creates a shortest distance of the trip, a priority of the autonomous vehicle, a priority of the passenger, an amount of idle time the autonomous vehicle has spent at the intersection, a ride quality experienced by the passenger, a total time of the trip, an expected arrival time of the autonomous vehicle at a destination, previous approval ratings of an autonomous vehicle service that is responsible for the autonomous vehicle, energy consumption of the autonomous vehicle, fuel consumption of the autonomous vehicle, remaining distance left on the trip, or a type of the trip. In an embodiment, some or all of the characteristics of the trip may be weighted.

The second autonomous vehicle also generates a second bid for turn priority. The second bid is indicative of a second importance that the second autonomous vehicle traverses the intersection. The second bid is based upon second characteristics of a second trip of a second passenger riding in the second autonomous vehicle. The second characteristics may be similar to the above-identified characteristics.

The computing system of the autonomous vehicle transmits the first bid to a networked computing system. The second autonomous vehicle also transmits the second bid to the networked computing system. The networked computing system receives the first bid and the second bid. The networked computing system determines a turn order (i.e., which autonomous vehicle is to traverse the intersection first) of the autonomous vehicle and the second autonomous vehicle based upon the first bid and the second bid. More specifically, the networked computing system determines the turn order based upon the characteristics and the second characteristics. In an example, the autonomous vehicle may have arrived at the intersection subsequent to the second autonomous vehicle, but the turn order may indicate that the autonomous vehicle is to traverse the intersection prior to the second autonomous vehicle traversing the intersection.

The networked computing system further transmits the turn order to the autonomous vehicle as well as the second autonomous vehicle. Responsive to receiving the turn order, the computing system of the autonomous vehicle controls at least one of the vehicle propulsion system, the braking system, or the steering system based upon the turn order. Additionally, the second autonomous vehicle also operates based upon the turn order.

The above-described technologies present various advantages over conventional motion planning technologies. First, through use of the bid system described above, the above-described technologies may reduce the amount of computing resources utilized by the autonomous vehicle in determining when the autonomous vehicle is to traverse an intersection. Second, the above-described technologies facilitate a more efficient flow of traffic that is not bound by conventional right of way rules.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
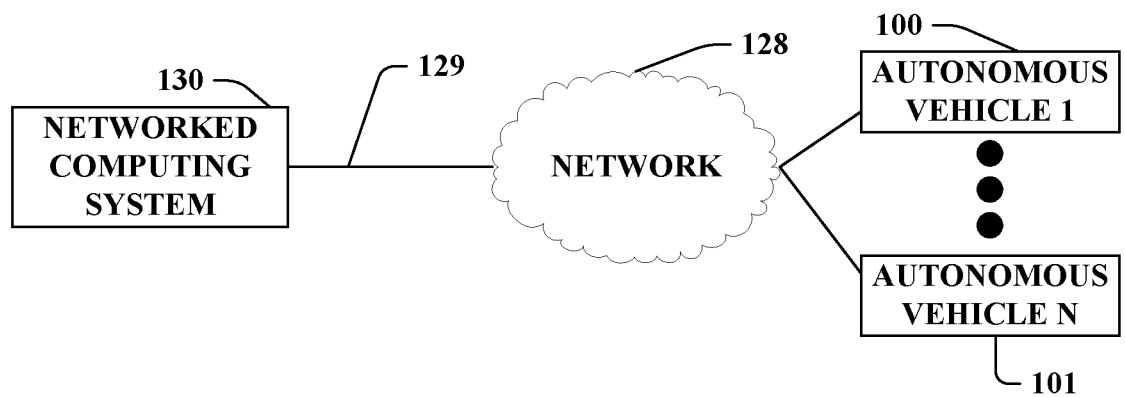
FIG. 1 illustrates a functional block diagram of a networked environment including an exemplary autonomous vehicle.

Various technologies pertaining to determining a turn order of multiple autonomous vehicles and/or querying surrounding autonomous vehicles for cached objects and/or fields of view as part of motion planning for an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to the drawings, FIG. 1 illustrates a networked environment of multiple autonomous vehicles 1 100 to N 101, namely an autonomous vehicle 1 100, . . . , and an autonomous vehicle N 101, where N can be substantially any integer greater than 1. In the illustrated example, a networked computing system 130 is in communication with the autonomous vehicles 100-101 via a network 128. In an embodiment, the networked computing system 130 may be a server computing device or a cloud computing system. The network 128 includes a communication link 129. The communication link 129 can use various communication protocols, such as wireless communications, cellular communications, IEEE 802.11 (Wi-Fi), Long Term Evolution (LTE), Time Division Multiplex (TDM), asynchronous transfer mode (ATM), Internet Protocol (IP), Ethernet, synchronous optical networking (SONET), hybrid fiber-coax (HFC), circuit-switched, communication signaling, or some other communication format, including combinations, improvements, or variations thereof. Communication links can each be a direct link or can include intermediate networks, systems, or devices, and can include a logical network link transported over multiple physical links.

Although a single communication link is shown in FIG. 1 between particular elements, it should be understood that this is merely illustrative to show communication modes or access pathways. In other examples, further links can exist, with portions of the further links shared and used for different communication sessions or different content types, among other configurations. Communication links can each include many different signals sharing the same associated link, such as: resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 2A:
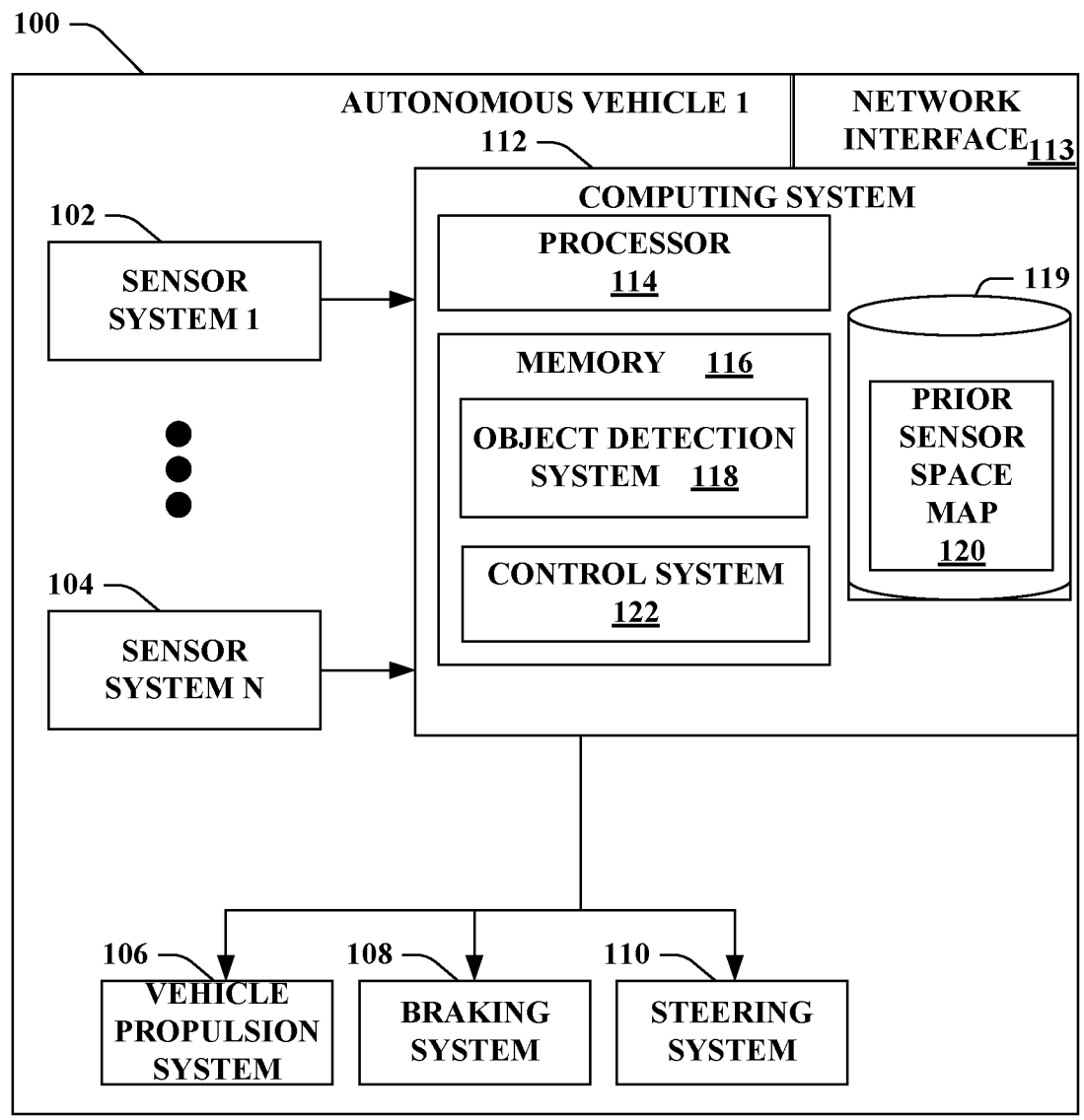
FIG. 2A illustrates a functional block diagram of an exemplary autonomous vehicle.

Referring now to FIG. 2A, the exemplary autonomous vehicle 1 100 that is part of the networked environment described in FIG. 1 is illustrated. The autonomous vehicle 1 100 can navigate about roadways without human conduction based upon sensor signals outputted by sensor systems of the autonomous vehicle 1 100. The autonomous vehicle 1 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the autonomous vehicle 1 100. For example, the sensor system 1 102 may be a lidar sensor system and the sensor system N 104 may be a camera (image) sensor system. Other exemplary sensor systems included in the sensor systems 102-104 can include radar sensor systems, global positioning system (GPS) sensor systems, sonar sensor systems, infrared sensor systems, and the like.

The autonomous vehicle 1 100 further includes several mechanical systems that are used to effectuate appropriate motion of the autonomous vehicle 1 100. For instance, the mechanical systems can include, but are not limited to, a vehicle propulsion system 106, a braking system 108, and a steering system 110. The vehicle propulsion system 106 may be an electric motor, an internal combustion engine, or a combination thereof. The braking system 108 can include an engine brake, brake pads, actuators, and/or any other suitable componentry that is configured to assist in decelerating the autonomous vehicle 1 100. The steering system 110 includes suitable componentry that is configured to control the direction of movement of the autonomous vehicle 1 100.

The autonomous vehicle 1 100 additionally includes a computing system 112 that is in communication with the sensor systems 102-104, the vehicle propulsion system 106, the braking system 108, and the steering system 110. The computing system 112 includes a network interface 113, a processor 114, and memory 116. The memory 116 includes computer-executable instructions that are executed by the processor 114.

Pursuant to various examples, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The network interface 113 enables the autonomous vehicle 100 1 to communicate over the network 128. In an example, the autonomous vehicle 100 1 may communicate with the autonomous vehicle 101 N over the network 128 using the network interface 113. In another example, the autonomous vehicle 100 1 may communicate with the networked computing system 130 using the network interface 113. The Network interface 113 may use various wired and wireless connection protocols such as, direct connect, Ethernet, Bluetooth®, IEEE 1394a-b, serial, universal serial bus (USB), Digital Visual Interface (DVI), 802.11a/b/g/n/x, cellular, Miracast, and the like.

The computing system 112 can further include a data store 119. The data store 119 may include a prior sensor space map 120 that includes prior data for geographic locations in a driving environment corresponding to whether predefined static objects are located at the geographic locations. In an example, the prior sensor space map 120 may be based upon radar signals. The predefined static objects may be buildings or objects that can reflect radar signals. Moreover, the predefined static objects may be at geographic locations that are in paths of autonomous vehicles, such as the autonomous vehicle 1 100. The prior data in radar outputs corresponding to the predefined static objects can yield false positives or obscured results, which can detrimentally impact operation of the autonomous vehicle 1 100. For example, the autonomous vehicle 1 100 may stop due to incorrectly equating the radar data corresponding to the manhole cover as a car.

The prior sensor space map 120 may further include known occlusions in driving environments that are blocked from radar or lidar that may be potentially hazardous to the autonomous vehicle 1 100 without further information. While many of the examples set forth herein describe the data store 119 of the autonomous vehicle 1 100 as including the prior sensor space map 120, it is contemplated that a data store of the networked computing system 130 can additionally or alternatively include the prior sensor space map 120.

Pursuant to another example, it is to be appreciated that the data store 119 of the autonomous vehicle 1 100 may include a portion of the prior sensor space map 120 (e.g., the autonomous vehicle 1 100 can receive the portion of the prior sensor space map 120 from the networked computing system 130 or from the autonomous vehicle N 101 in the surrounding area) to aid in predicting future occlusions. The autonomous vehicle 1 100 may generate the prior sensor space map 120 as an occupancy grid by collecting sensor signals output by the sensor systems 102-104 over time and identifying the predefined static object that are occlusions in the sensor signals. This is convenient for determining occlusions, such as, buildings, but may not be effective for stalled vehicles on the road, as an example.

The memory 116 of the computing system 112 includes an object detection system 118. The object detection system 118 can retrieve prior data for the geographic location in the driving environment of the autonomous vehicle 1 100 from the prior sensor space map 120. If the object detection system 118 identifies a predefined static object or a real time static object as an occlusion to sensor signals at the geographic location (e.g., as specified in the prior sensor space map 120), then the prior data for the geographic location can aid in reconfiguring an occupancy grid from the sensor signals of another autonomous vehicle in the geographic location, as will be further discussed below.

The memory 116 additionally includes a control system 122. The control system 122 is configured to control at least one of the mechanical systems of the autonomous vehicle 1 100 (e.g., at least one of the vehicle propulsion system 106, the braking system 108, and/or the steering system 110). For instance, the control system 122 can control the vehicle propulsion system 106, the braking system 108, and/or the steering system 110 based on a motion plan generated by the computing system 112 or a turn order plan for the autonomous vehicle 1 100 generated by the networked computing system 130, as will be further discussed below.

Figure 2B:
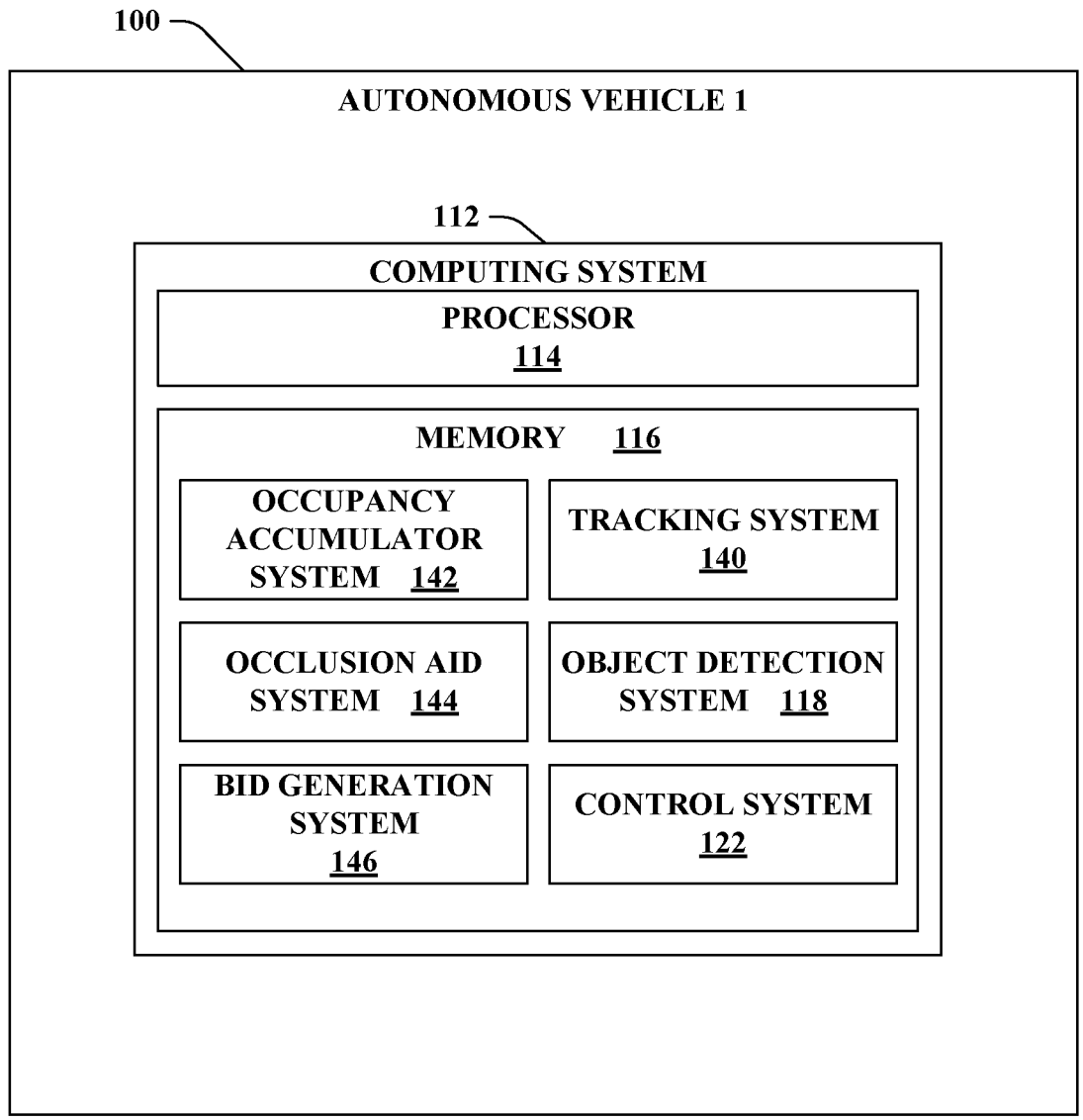
FIG. 2B illustrates a functional block diagram of a computing system of the autonomous vehicle of FIG. 2 in accordance with various examples.

Now turning to FIG. 2B, illustrated is the computing system 112 of the autonomous vehicle 1 100 of FIG. 2A according to various embodiments. The computing system 112 again includes the processor 114 and the memory 116. The memory 116 can include the object detection system 118, the control system 122, and further can include a tracking system 140, an occupancy accumulator system 142, an occlusion aid system 144, and a bid generation system 146.

The memory 116 can include a tracking system 140. The tracking system 140 can track an object in a driving environment surrounding the autonomous vehicle 1 100 based on sensor signals outputted by the sensor systems 102-104 of the autonomous vehicle 1 100 for a given time (in real time). Further, the object tracked in the driving environment can be referred to as a tracked object. The tracked object can be, for instance, a vehicle, another autonomous vehicle, a truck, a bus, a bike, a pedestrian, or the like. The tracking system 140 can identify where the object is located in the driving environment surrounding the autonomous vehicle 1 100 based on the sensor signals outputted by the sensor system 102-104 for the given time. Moreover, the tracking system 140 can determine a speed at which the object is moving, a direction of movement of the object, and so forth. While one object is described as being tracked, it is contemplated that the tracking system 140 may track substantially any number of objects in the driving environment surrounding the autonomous vehicle 1 100. The tracking system 140 may also be used to determine that a second autonomous vehicle N 101 is in proximity to an intersection.

Moreover, the memory 116 of the computing system 112 can include an occupancy accumulator system 142. The occupancy accumulator system 142 can generate an accumulated occupancy grid for a given time based at least in part on the data outputted by the sensor systems 102-104 for the given time. The occupancy accumulator system 142 can remove the tracked object(s) in the driving environment to generate the accumulated occupancy grid for the given time. The occupancy accumulator system 142 can determine the layout of the road including upcoming intersections and/or crossways. The occupancy accumulator system 142 can determine when the autonomous vehicle is within a predetermined proximity to an intersection (e.g., 500 ft, 100 ft, 50 ft, 10 ft).

Moreover, the occupancy accumulator system 142 can further generate the accumulated occupancy grid for the given time. The grid can specify an undrivable area in the driving environment surrounding the autonomous vehicle 1 100. Thus, for instance, the accumulated occupancy grid can include at least one cell that signifies the undrivable area in the driving environment. The occupancy accumulator system 142 can also detect an unknown area or occlusion in the driving environment surrounding the autonomous vehicle 1 100 based on the data outputted by the sensor systems 102-104 for the given time. The unknown area in the driving environment, for instance, can be occluded from a perspective of a sensor system in the sensor systems 102-104. Accordingly, the occupancy accumulator system 142 can generate the accumulated occupancy grid for the given time, such that at least one cell signifies the unknown area in the driving environment.

The memory 116 of the computing system 112 includes an occlusion aid system 144. According to an illustration, one or more of the sensor systems 102-104 can output sensor signals that are indicative of the driving environment surrounding the autonomous vehicle 1 100. Following this illustration, the occupancy accumulator system 142 can generate an occupancy grid based on the sensor signals outputted by the one or more sensor systems 102-104 or the object detection system 118 can generate an occupancy grid based on the prior data known at a certain geographic location in the driving environment.

Once the occupancy accumulator system 142 determines that an occlusion exists along a travelled path of the autonomous vehicle 1 100, the occlusion aid system 144 of the autonomous vehicle 1 100 may transmit a query to the autonomous vehicle N 101 in the driving environment. As an example, the occlusion aid system 144 the query may be indicative of whether particular cells of an occupancy grid are blocked by an occlusion (the occupancy grid created by either the object detection system 118 or the occupancy accumulator system 142). The particular cells for which the occlusion aid system 144 performs the query can represent the space in the occupancy grid past the occlusion to determine if there is an object (e.g. on-coming traffic). This information may be queried directly from the autonomous vehicle N 101 or from the networked computing system 130 (or another computing system). In an embodiment, a transmission protocol confirms the connection between the occlusion aid system 144 and the networked computing system 130. Either the networked computing system 130 acts as a proxy to the autonomous vehicle N 101 or the autonomous vehicle N 101 itself may transmit sensor signals output from sensor systems of the autonomous vehicle N 101 that included the requested cells.

The query may be a short-range transmission so that only the autonomous vehicle N 101 in unknown areas of the driving environment can respond. The unknown areas are transmitted with the query as data (e.g. packets) and the autonomous vehicle N 101 can use its sensor signals output by sensor systems of the autonomous vehicle N 101 to aid in correcting the obstructed view of the autonomous vehicle 1 100. An occlusion aid system of the autonomous vehicle N 101 transmits the appropriate sensor signals to reveal the obstructed area or the area surrounding it for autonomous vehicle 1 100. The occlusion aid system 114 of the autonomous vehicle 1 100 may work with the occupancy accumulator system 142 to create a full occupancy grid including the previously unknown area.

In another example, the query may be transmitted to the networked computing system 130. The networked computing system 130 may be better suited to determine that the autonomous vehicle N 101 is better able to provide the autonomous vehicle 1 100 with sensor signals for the unknown area. This may aid in selecting a single autonomous vehicle to respond instead of numerous autonomous vehicles, unless more than one autonomous vehicle is necessary to completely reveal the obstructed area.

The memory 116 of the computing system 112 includes a bid generation system 146. The bid generation system 146 can generate a bid for turn priority of the autonomous vehicle 1 100 at an intersection. The bid generation system 146 can generate the bid for turn priority at the intersection, where the bid is indicative of a first importance that the autonomous vehicle 100 traverses the intersection. Moreover, the bid generation system 146 can generate the bid based upon characteristics of a trip of a passenger riding in the autonomous vehicle 100.

Figure 3:
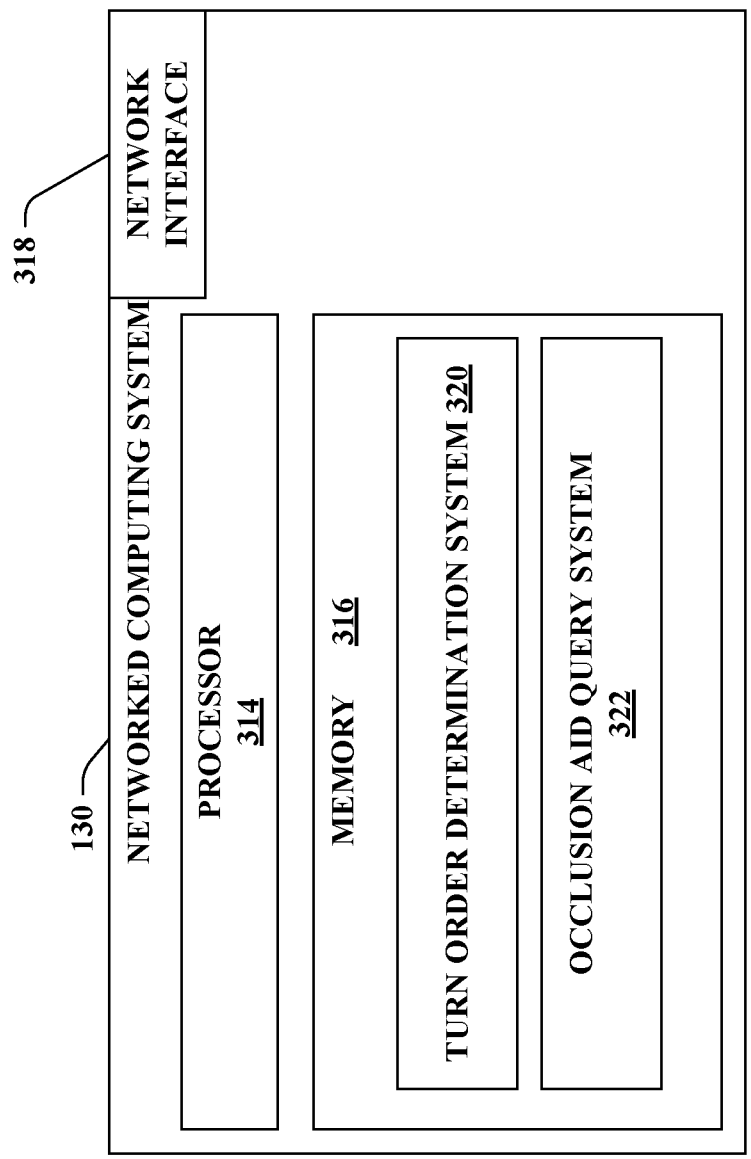
FIG. 3 illustrates a functional block diagram of an exemplary networked computing system.

Now turning to FIG. 3, illustrated is an exemplary networked computing system 130 in accordance with various embodiments. The networked computing system 130 can include a processor 314, memory 316, and a network interface 318. The memory 316 can include a turn order determination system 320 and an occlusion aid query system 322.

Pursuant to various examples, the processor 314 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Network interface 318 enables the networked computing system 130 to communicate over the network 128 with the autonomous vehicle 1 100 and the autonomous vehicle N 101. Network interface 318 may use various wired and wireless connection protocols such as, direct connect, Ethernet, Bluetooth®, IEEE 1394a-b, serial, universal serial bus (USB), Digital Visual Interface (DVI), 802.11a/b/g/n/x, cellular, miracast, and the like.

The memory 316 of the networked computing system 130 includes a turn order determination system 320. As will be described in greater detail below, the turn order determination system 320 can receive bids for turn priority at the intersection from different autonomous vehicles at a given location (e.g. proximate to an intersection) and can generate a turn order (for the intersection) based on the bids.

The memory 316 of the networked computing system 130 includes an occlusion aid query system 322. According to an example, the autonomous vehicle 1 100 can submit to the networked computing system 130 a query for particular cells of a particular occupancy grid (e.g. cells blocked by an occlusion). The networked computing system 130 may transmit a request to the autonomous vehicle N 101 in the area to transmit to the autonomous vehicle 1 100 the particular cells in question. The nearest autonomous vehicle N 101 may not be in proximity to the particular cells (e.g. 10 ft, 25 ft, or 50 ft away). The nearest autonomous vehicle N 101 may be passing that area at a given moment in time. Ideally, the nearest autonomous vehicle N 101 is proximate to the queried particular cells and can continuously feed sensor signals indicative of those particular cells. It is foreseen that the autonomous vehicle 1 100 and the autonomous vehicle N 101 may not be in direct communication with one another. In this case, the occlusion aid query system 322 may transmit sensor signals output by sensor systems of the autonomous vehicle N 101 to the autonomous vehicle 1 100 to fill in the occupancy grid for the queried cells. It is envisioned that if the autonomous vehicle N 101 is not be able to attain all of the queried cells, additional autonomous vehicles may also be queried.

Operation of the autonomous vehicle 1 100 and the networked computing system 130 is now set forth. It is contemplated that autonomous vehicle 1 100 and the autonomous vehicle N 101 are approaching an intersection. The computing system of the autonomous vehicle determines that autonomous vehicle 1 100 and the second autonomous vehicle are proximate to the intersection based upon a plurality of sensor signals generated by the sensor systems 102-104 of the autonomous vehicle 1 100. Likewise, a computing system of the autonomous vehicle N 101 also determines that the autonomous vehicle 1 100 and the autonomous vehicle N 101 are proximate to the intersection based upon a plurality of sensor signals generated by a plurality of sensor systems of the autonomous vehicle N 101.

The autonomous vehicle 1 100 generates a first bid for turn priority at the intersection (e.g., utilizing the bid generation system 146). The first bid is indicative of a first importance that autonomous vehicle 1 100 traverses the intersection. The first bid is based upon characteristics of a trip of a passenger riding in the autonomous vehicle 1 100. Alternatively, when the autonomous vehicle 1 100 is not transporting a passenger, the first bid may be based solely on characteristics of a trip of the autonomous vehicle.

The characteristics of the trip of the passenger may include at least one of an intended path of the autonomous vehicle 1 100 that creates a shortest distance of the trip, a priority of the autonomous vehicle 1 100, a priority of the passenger, an amount of idle time the autonomous vehicle 1 100 has spent at the intersection, a ride quality experienced by the passenger, a total time of the trip, an expected arrival time of the autonomous vehicle 1 100 at a destination, previous approval ratings of an autonomous vehicle service that is responsible for the autonomous vehicle 1 100, energy consumption of the autonomous vehicle 1 100, fuel consumption of the autonomous vehicle 1 100, remaining distance left on the trip, or a type of the trip. In an embodiment, some or all of the characteristics of the trip may be weighted.

The autonomous vehicle N 101 also generates a second bid for turn priority. The second bid is indicative of a second importance that the autonomous vehicle N 101 traverses the intersection. The second bid is based upon second characteristics of a second trip of a second passenger riding in the autonomous vehicle N 101. The second characteristics may be similar to the above-identified first characteristics, but are from the perspective of a trip of the second passenger riding in the autonomous vehicle N 101.

The computing system 112 of the autonomous vehicle 1 100 transmits the first bid to the networked computing system 130. The autonomous vehicle N 101 also transmits the second bid to the networked computing system 130. The networked computing system 130 then receives the first bid and the second bid. The networked computing system 130 may determine that the autonomous vehicle 1 100 and the autonomous vehicle N 101 are both present at the intersection at a similar time based upon the first bid and the second bid. For instance, in an embodiment, the first bid may comprise a first location of the autonomous vehicle 1 100 in the driving environment and the second bid may comprises a second location of the autonomous vehicle N 101 in the driving environment. The networked computing system 130 may determine that the autonomous vehicle 1 100 and the autonomous vehicle N 101 are proximate to the intersection based upon the first bid, a first time at which the networked computing system 130 receives the first bid, the second bid, and a second time at which the networked computing system 130 receives the second bid. In another embodiment, the first bid may include an identifier for the autonomous vehicle 1 100 and the second bid may include an identifier for the autonomous vehicle N 101. The networked computing system 130 may determine that the autonomous vehicle 1 100 and the autonomous vehicle N 101 are present at the intersection based upon the identifier for the autonomous vehicle 1 100 and the identifier for the autonomous vehicle N 101.

The networked computing system 130 then determines a turn order (i.e., which autonomous vehicle is to traverse the intersection first) of the autonomous vehicle 1 100 and the autonomous vehicle N 101 based upon the first bid and the second bid. More specifically, the networked computing system 130 may determine the turn order based upon the first characteristics and the second characteristics. In an embodiment, each of the first characteristics may be assigned one or more weights and each of the second characteristics may be assigned one or more weights. The networked computing system 130 may sum the one or more weights to generate a score that is indicative of the first importance that the autonomous vehicle 1 100 traverses the intersection. Alternatively, the computing system 112 of the autonomous vehicle 100 1 may assign the weights and generate the score.

In an example, the autonomous vehicle 1 100 arrives at the intersection subsequent to the autonomous vehicle N 101. The networked computing system 130 may determine that the first importance is greater than the second importance. As such, the turn order may indicate that the autonomous vehicle 1 100 is to traverse the intersection prior to the autonomous vehicle N 101 traversing the intersection. Thus, it is to be understood that the above-described bid process may result in a turn order for the intersection that differs from conventional traffic rules.

In a scenario in which the plurality of sensor signals generated by the sensor systems 102-104 are indicative of a non-autonomous vehicle that is in proximity to the intersection, the autonomous vehicle 1 100 may fail to generate the first bid. Alternatively, the first bid may include an indication of the non-autonomous vehicle. The networked computing system 130 may then base the turn order upon times at which the autonomous vehicle 1 100, the autonomous vehicle N 101, and the non-autonomous vehicle arrive at the intersection.

In another scenario, the networked computing system 130 determines that a first future path of the autonomous vehicle 1 100 and a second future path of the autonomous vehicle N 101 fail to intersect. As such, the turn order may indicate that the autonomous vehicle 1 100 and the autonomous vehicle N 101 may traverse the intersection concurrently.

The networked computing system 130 then transmits the turn order to the autonomous vehicle 1 100. Responsive to receiving the turn order, the computing system 112 of the autonomous vehicle 1 100 controls at least one of the vehicle propulsion system 106, the braking system 108, or the steering system 110 based upon the turn order. The networked computing system 130 also transmits the turn order to the autonomous vehicle N 101. Responsive to receiving the turn order, the computing system of the autonomous vehicle N 101 controls at least one of a vehicle propulsion system, a braking system, or a steering system of the autonomous vehicle N 101 based upon the turn order.

In an example, the networked computing system 130 determines that first importance is less than the second importance, and as such the turn order indicates that the autonomous vehicle 1 100 is to traverse the intersection subsequent to the autonomous vehicle N 101 traversing the intersection. As such, the computing system 112 of the autonomous vehicle 1 100 controls at least one of the vehicle propulsion system 106, the braking system 108, or the steering system 110 such that the autonomous vehicle 1 100 traverses the intersection subsequent to the autonomous vehicle N 101 traversing the intersection. In another example, the networked computing system 130 determines that first importance is greater than the second importance, and as such the turn order indicates that the autonomous vehicle 1 100 is to traverse the intersection prior to the autonomous vehicle N 101 traversing the intersection. As such, the computing system 112 of the autonomous vehicle 1 100 controls at least one of the vehicle propulsion system 106, the braking system 108, or the steering system 110 such that the autonomous vehicle 1 100 traverses the intersection prior to the autonomous vehicle N 101 traversing the intersection.

In an embodiment, prior to controlling at least one of the vehicle propulsion system, the braking system, or the steering system based upon the turn order, the autonomous vehicle 1 100 may transmit the first bid to the autonomous vehicle N 101. The autonomous vehicle 1 100 may receive the second bid from the autonomous vehicle N 101. The autonomous vehicle 1 100 and the autonomous vehicle N 101 may communicate with each other to determine the turn order.

In an embodiment, the autonomous vehicle 1 100 and the autonomous vehicle N 101 may belong to an autonomous vehicle fleet that is maintained by an autonomous vehicle service. In another embodiment, the autonomous vehicle 1 100 may belong to a first autonomous vehicle fleet maintained by a first autonomous vehicle service and the autonomous vehicle N 101 may belong to a second autonomous vehicle fleet maintained by a second autonomous vehicle service.

Figure 4:
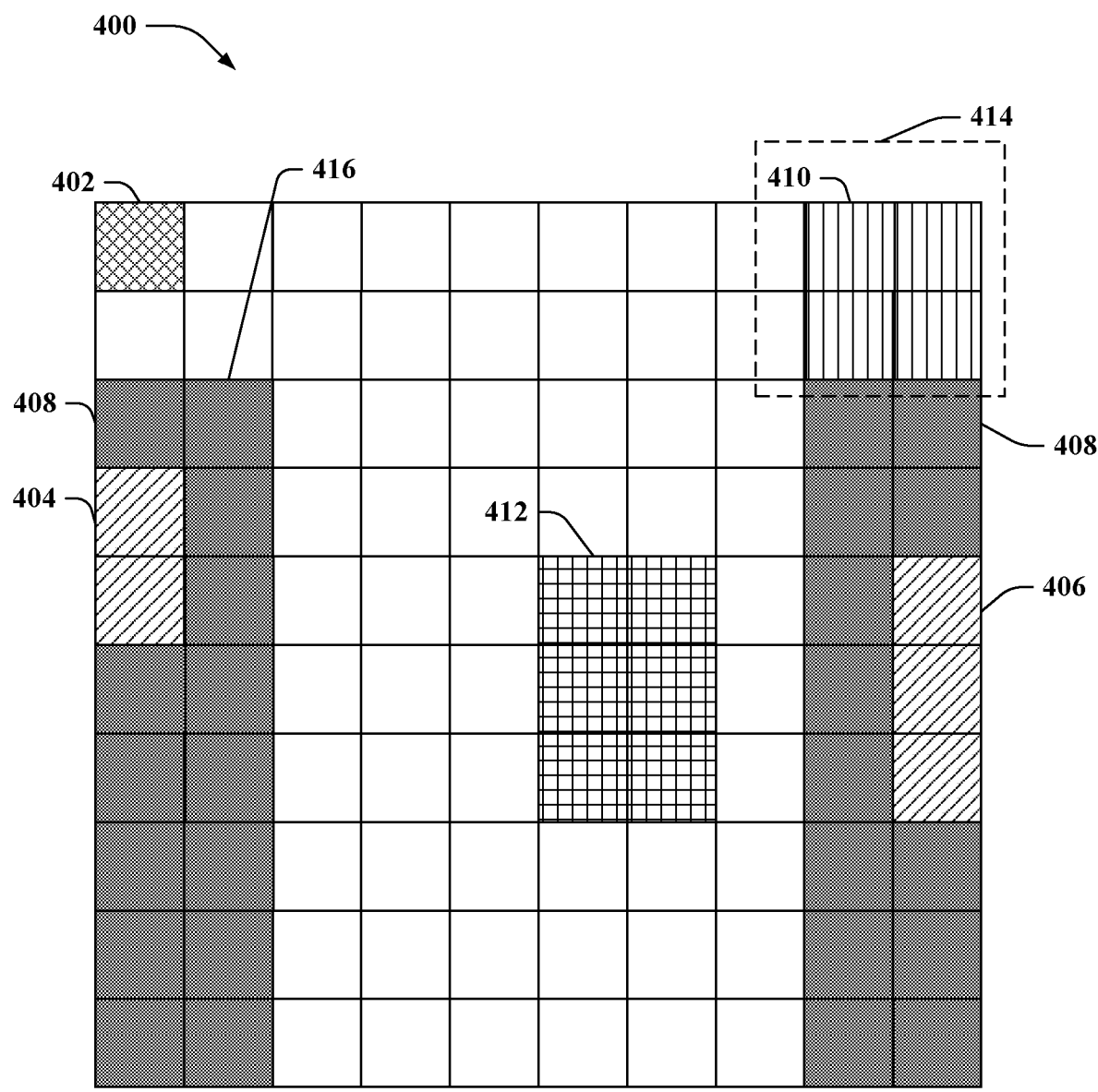
FIG. 4 illustrates an exemplary accumulated occupancy grid for a given time.

Now turning to FIG. 4, illustrated is an exemplary accumulated occupancy grid 400 for a given time. The accumulated occupancy grid 400 shown in FIG. 4 includes 10 rows and 10 columns of cells; however, it is contemplated that the depicted grid size is provided for illustration purposes, and other grid sizes are intended to fall within the scope of the hereto appended claims. As noted above, the occupancy accumulator system 142 can generate the accumulated occupancy grid 400 for the given time based at least in part on the sensor signals outputted by the sensor systems 102-104 for the given time (e.g., sensor signals outputted by a lidar sensor system, a radar sensor system, a camera sensor system, etc.) or from prior data at a given geographical location.

In the exemplary accumulated occupancy grid 400, cells 402 can correspond to a location of a tracked object in the driving environment. Moreover, in the exemplary accumulated occupancy grid 400, cells 404 and cells 406 can correspond to locations of non-tracked objects in the sensor signals outputted by the sensor systems 102-104. For instance, the non-tracked objects can be static objects (e.g., non-moving objects) in the driving environment surrounding the autonomous vehicle 1 100. Accordingly, the cells 404 and the cells 406 corresponding to the non-tracked objects can remain in the accumulated occupancy grid 400.

As noted above, the occupancy accumulator system 142 can generate the accumulated occupancy grid 400 based on prior map data. The prior map data, for instance, can specify that cells 408 in the accumulated occupancy grid 400 correspond to an undrivable area in the driving environment surrounding the autonomous vehicle 1 100 (e.g., the cells 408 can correspond to a location of a sidewalk, a median, or the like). Moreover, the occupancy accumulator system 142 can detect an unknown area in the driving environment surrounding the autonomous vehicle 1 100 based on the sensor signals outputted by the sensor systems 102-104 for the given time. For instance, the cells 410 in the accumulated occupancy grid 400 can correspond to an unknown area in the driving environment. Furthermore, an orientation of the cells 412 in the occupancy grid 400 can indicate a proposed orientation of the autonomous vehicle 1 100 in the driving environment corresponding to the occupancy grid 400.

With reference to the occlusion aid system 144, a query depicted in FIG. 4 includes a box 414 that has cells 410. The query can be performed to identify whether any of the cells 414 either overlap cells corresponding to tracked objects (including the autonomous vehicle N 101), non-tracked objects, or undrivable areas. If it is determined by the occlusion aid system 144 to be the autonomous vehicle N 101, then the bid generation system 146 described above may activate, since both the autonomous vehicle 1 100 and the autonomous vehicle N 101 are located proximate to an intersection 416.

Figure 5A:
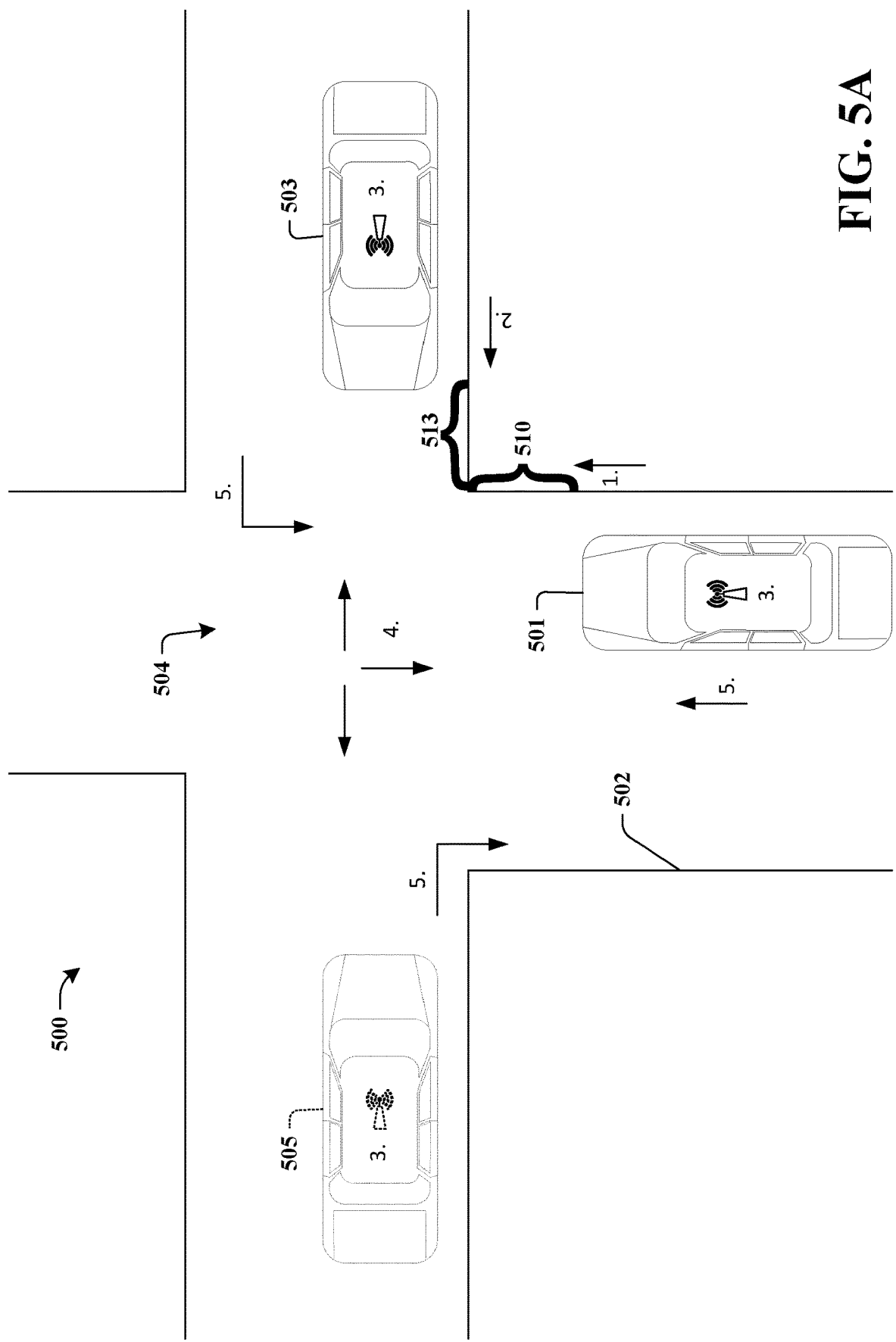
FIG. 5A illustrates an exemplary driving environment of autonomous vehicles.

With reference to FIG. 5A, a driving environment 500 is illustrated, where autonomous vehicles 501, 503 are about to enter into an intersection 504. The autonomous vehicle 501 and the autonomous vehicle 503 may comprise components similar or identical to the autonomous vehicle 1 100 described above. The autonomous vehicle 501 has entered into proximity 510 of the intersection 504 (e.g. 100 ft, 50 ft, 10 ft) and has detected the autonomous vehicle 503 based upon sensor signals output by sensor systems of the autonomous vehicle 501 (Step 1). The autonomous vehicle 503 has also entered into proximity 513 of the intersection 504 and detected autonomous vehicle 501 based on sensor signals output by sensor systems of the autonomous vehicle 503. (Step 2). The driving environment also includes a vehicle 505. As described above, when vehicle 505 is non-autonomous, then the autonomous vehicles 501, 503 will not submit bids for turn order, but will comply with the conventional "right of way" rules of the road, e.g. first to enter the intersection will go first, etc.

If vehicle 505 is an autonomous vehicle and has reached a predetermined proximity from the intersection so as to be detected by the other two autonomous vehicles 501, 503, then each of the autonomous vehicle 501, 503, 505 will transmit bids to the networked computing system 130 (Step 3). The bids are based upon characteristics of trips of passengers (described above) riding in the autonomous vehicles 501, 503, 505. The autonomous vehicles 501, 503, 505 may assign the characteristics numerical values and may sum the numerical values to include in the bids. In an embodiment, certain characteristics may be ignored and hence some characteristics may be assigned a numerical value of 0. The autonomous vehicles 501, 503, 505 may then transmit their respective bids (e.g., a first bid for the autonomous vehicle 501, a second bid for the autonomous vehicle 503, and a third bid for the autonomous vehicle 505) to the networked computing system 130.

The networked computing system 130 receives the bids from the autonomous vehicles 501, 503, 505. The networked computing system 130 determines a turn order based on the bids using a process similar to that described above (Step 4). The networked computing system 130 then transmits the turn order to each of the autonomous vehicles 501, 503, 505.

The autonomous vehicles 501, 503, 505 then receive the turn order from the networked computing system 130 and each of the autonomous vehicles 501, 503, 505 traverse the intersection 504 according to the turn order (Step 5). In the case of the autonomous vehicle 501 and the autonomous vehicle 505, their intended paths do not meet. Their "turn" may be considered equal and therein, the turn order may dictate that they go at the same time. In the illustrated example, autonomous vehicle 501 would maintain a straight heading and autonomous vehicle 505 would execute a right-hand turn. This would be followed by autonomous vehicle 503 executing a left-hand turn. It is envisioned that further lane maneuvers may be accomplished, such as lane changes during the intersection to maneuver around another autonomous vehicle.

Figure 5B:
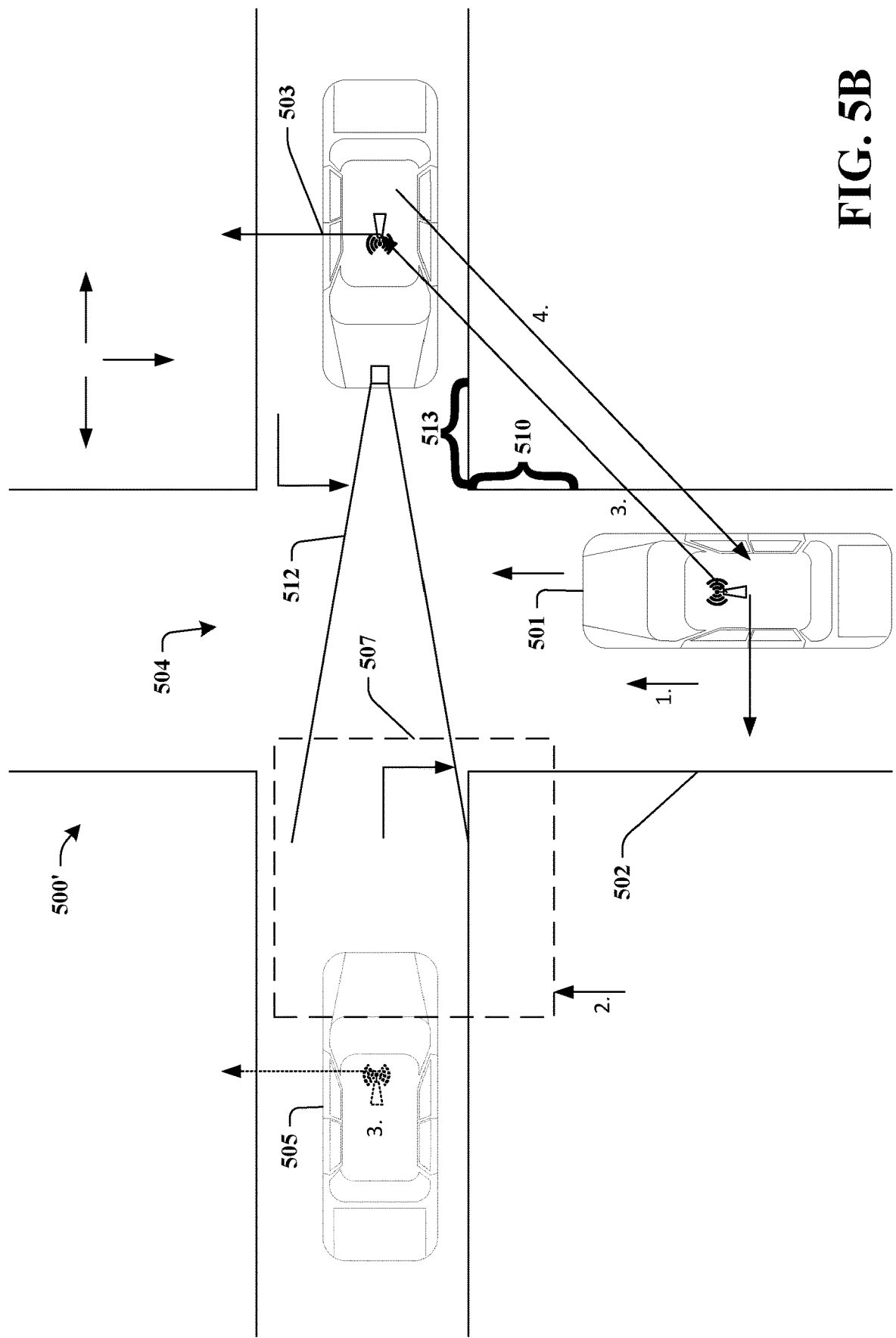
FIG. 5B illustrates an exemplary driving environment of autonomous vehicles.

With reference to FIG. 5B, a similar driving environment 500' to environment 500 is illustrated, but in this example, the autonomous vehicle 501 has an obscured portion 507 in an occupancy grid and hence cannot perceive the vehicle 505. This may be due to there being an occlusion 502. The driving environment 500' includes an intersection 504, the autonomous vehicles 501, 503, and 505, and the obscured portion 507.

The autonomous vehicle 501 generates an occupancy grid (Step 1). The occupancy grid of the autonomous vehicle 501 includes an obscured section 507 (i.e., a blind spot) (Step 2). The obscured section 507 may be hiding a vehicle 505 (illustrated in dashed lines). Since the autonomous vehicle 501 cannot perceive objects obfuscated by the occlusion 502, the autonomous vehicle 501 may transmit a query (Step 3) to the networked computing system 130 (not shown) in an indirect approach or the autonomous vehicle 501 may transmit the query to the autonomous vehicle 503 in a direct approach. When the autonomous vehicle 501 transmits the query to the networked computing system 130, then the networked computing system 130 determines an appropriate autonomous vehicle (e.g., the autonomous vehicle 503) to provide sensor signals 512 that the autonomous vehicle 501 may utilize to "fill in" the obscured section 507.

In an illustrated example, the networked computing system 130 selects the autonomous vehicle 503 to submit the sensor signals 512 to the autonomous vehicle 501 (Step 4). If the autonomous vehicle 501 broadcast the query in an omni-directional fashion, then the autonomous vehicle 503 receives the query and transmits the sensor signals 512 to the autonomous vehicle 501. It is also envisioned that the autonomous vehicle 503 may submit its sensor signals 512 to the networked computing system 130, which in turn transmits the sensor signals 512 to the autonomous vehicle 501 and/or the autonomous vehicle 505.

Although the bid process and the sensor occlusion process described above are described as being executed by the networked computing system 130, it is to be understood that these processes may be performed by different computing systems.

Figure 6:
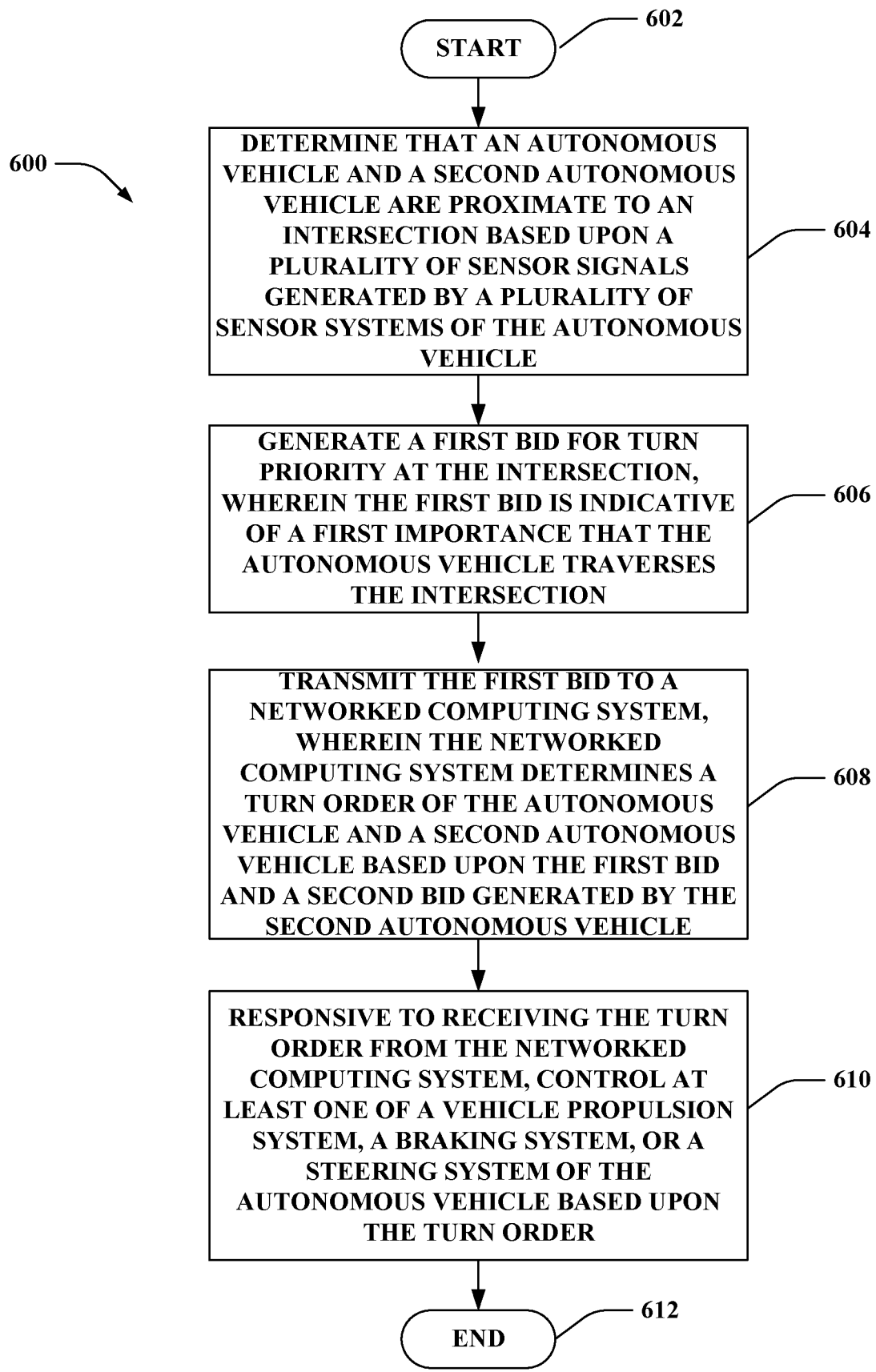
FIG. 6 is a flow diagram that illustrates an exemplary methodology executed by an autonomous vehicle for generating a bid for turn priority at an intersection.
Figure 7:
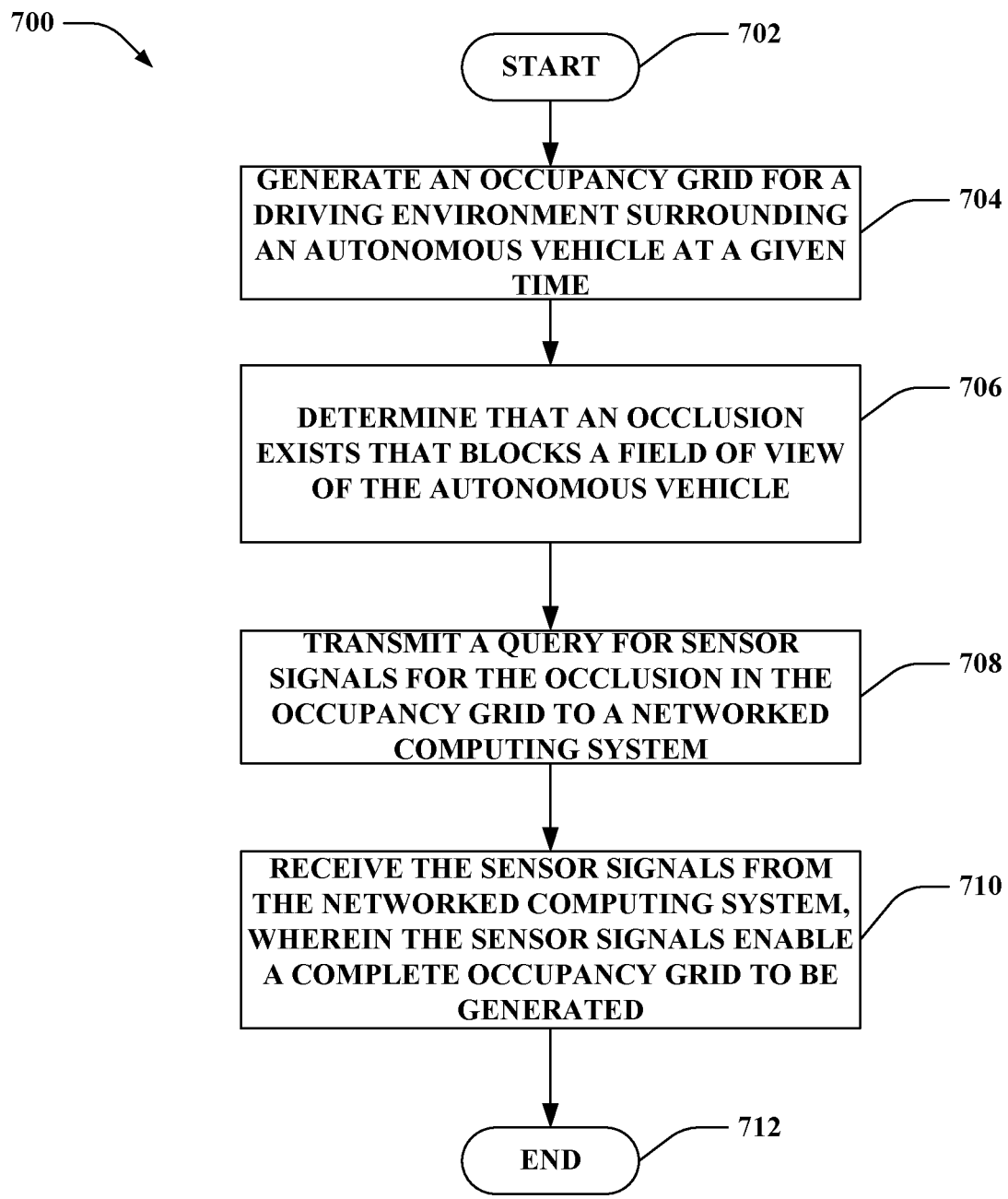
FIG. 7 is a flow diagram that illustrates an exemplary methodology executed by an autonomous vehicle for removing an occlusion from an occupancy grid.
Figure 8:
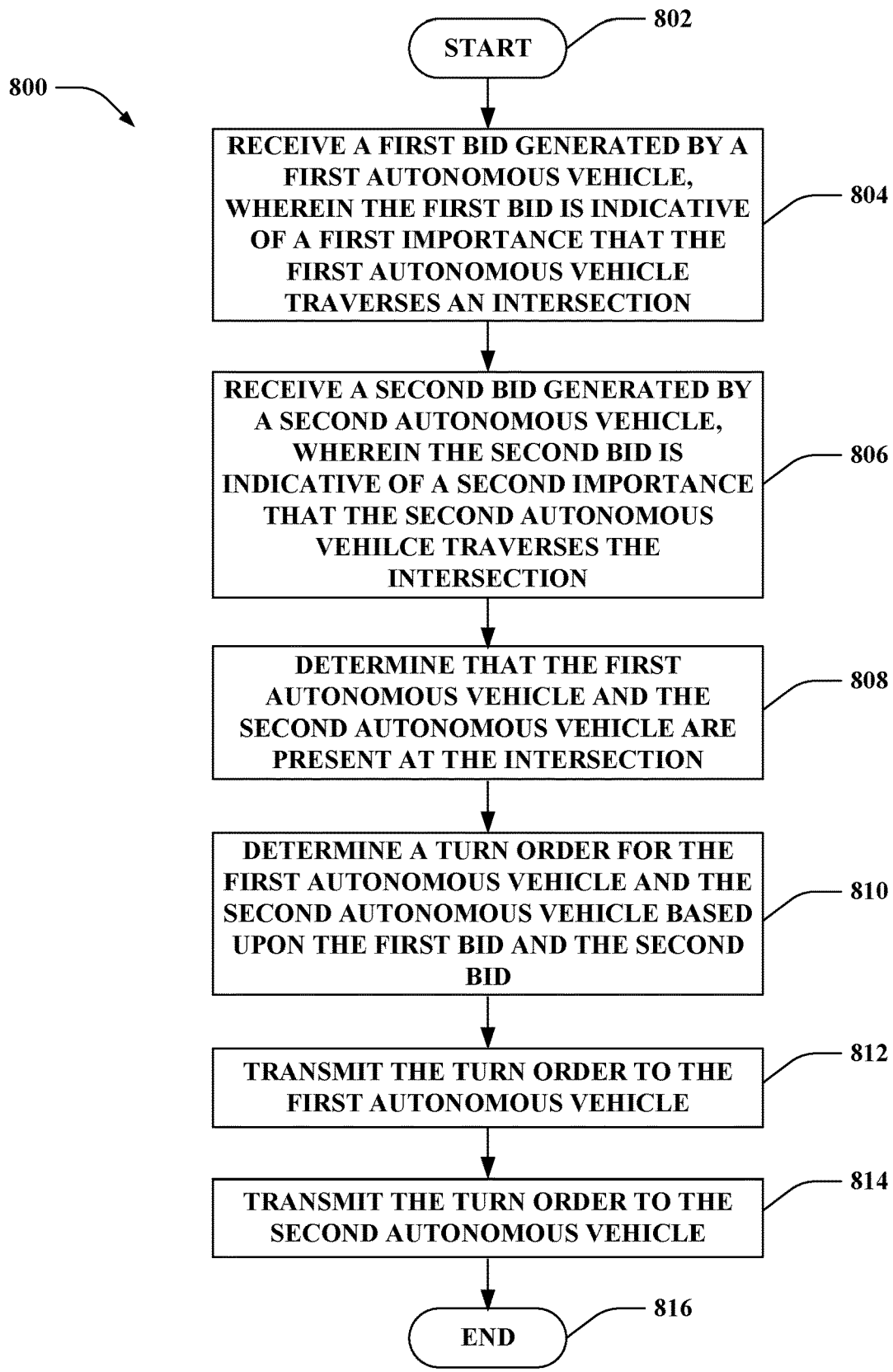
FIG. 8 is a flow diagram that illustrates an exemplary methodology executed by a networked computing system for generating a turn order from bids received from multiple autonomous vehicles.

FIGS. 6-8 illustrate exemplary methodologies relating to bid generation and turn order determination for an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable non-transitory medium, displayed on a display device, and/or the like.

FIG. 6 illustrates a methodology 600 executed by an autonomous vehicle for generating a bid for turn priority at an intersection. The methodology 600 begins at 602, and at 604 the autonomous vehicle determines that the autonomous vehicle and a second autonomous vehicle are proximate to an intersection based upon a plurality of sensor signals generated by a plurality of sensor systems of the autonomous vehicle. At 606, the autonomous vehicle generates a first bid for turn priority at the intersection. The first bid is indicative of a first importance that the autonomous vehicle traverses the intersection. The first bid is based upon characteristics of a trip of a passenger riding in the autonomous vehicle.

At 608, the autonomous vehicle transmits the first bid to a networked computing system. The networked computing system determines a turn order of the autonomous vehicle and the second autonomous vehicle based upon the first bid and a second bid generated by the second autonomous vehicle. The second bid is indicative of a second importance that the second autonomous vehicle traverses the intersection. The networked computing system transmits the turn order to the autonomous vehicle and the second autonomous vehicle. At 610, responsive to receiving the turn order from the networked computing system, the autonomous vehicle controls at least one of a vehicle propulsion system, a braking system, or a steering system of the autonomous vehicle based upon the turn order. The methodology 600 concludes at 612.

FIG. 7 illustrates a methodology 700 executed by an autonomous vehicle for removing an occlusion (i.e., a blind spot) from an occupancy grid. The methodology 700 begins at 702, and at 704, the autonomous vehicle generates an occupancy grid for a driving environment surrounding the autonomous vehicle for a given time. At 706, the autonomous vehicle determines that an occlusion exists that blocks a field of view of the autonomous vehicle. In a non-limiting example, the occlusion can be a building, a parked car, or a material that reflects radar.

At 708, the autonomous vehicle transmits a query for sensor signals for the occlusion in the occupancy grid to a networked computing system. The query includes an indication of the occlusion in the occupancy grid that is in question and needs to be filled in with other sensory data. The networked computing system gathers the sensor signals from a second autonomous vehicle. At 710, the autonomous vehicle receives the sensor signals from the networked computing system, wherein the sensor signals enable a complete occupancy grid to be generated. The methodology 700 concludes at 712.

Turning now to FIG. 8, illustrated is a methodology 800 executed by a networked computing system for generating a turn order from bids received from multiple autonomous vehicles. The methodology 800 begins at 802, and at 804, the networked computing system receives a first bid generated by a first autonomous vehicle. The first bid is indicative of a first importance that the first autonomous vehicle traverses an intersection. The first bid is based upon first characteristics of a first trip of a first passenger riding in the first autonomous vehicle. At 806, the networked computing system receives a second bid generated by a second autonomous vehicle. The second bid is indicative of a second importance that the second autonomous vehicle traverses the intersection. The second bid is based upon second characteristics of a second trip of a second passenger riding in the second autonomous vehicle.

At 808, the networked computing system determines that the first autonomous vehicle and the second autonomous vehicle are both present at the intersection based upon the first bid and the second bid. At 810, the networked computing system determines a turn order for the first autonomous vehicle and the second autonomous vehicle at the intersection based upon the first bid and the second bid. The turn order indicates that the first autonomous vehicle is to traverse the intersection prior to the second autonomous vehicle traversing the intersection or that the first autonomous vehicle is to traverse the intersection subsequent to the second autonomous vehicle traversing the intersection.

At 812, the networked computing system transmits the turn order to the first autonomous vehicle, wherein the first autonomous vehicle operates based upon the turn order. At 814, the networked computing system transmits the turn order to the second autonomous vehicle, wherein the second autonomous vehicle operates based upon the turn order. The methodology 800 concludes at 816.

Figure 9:
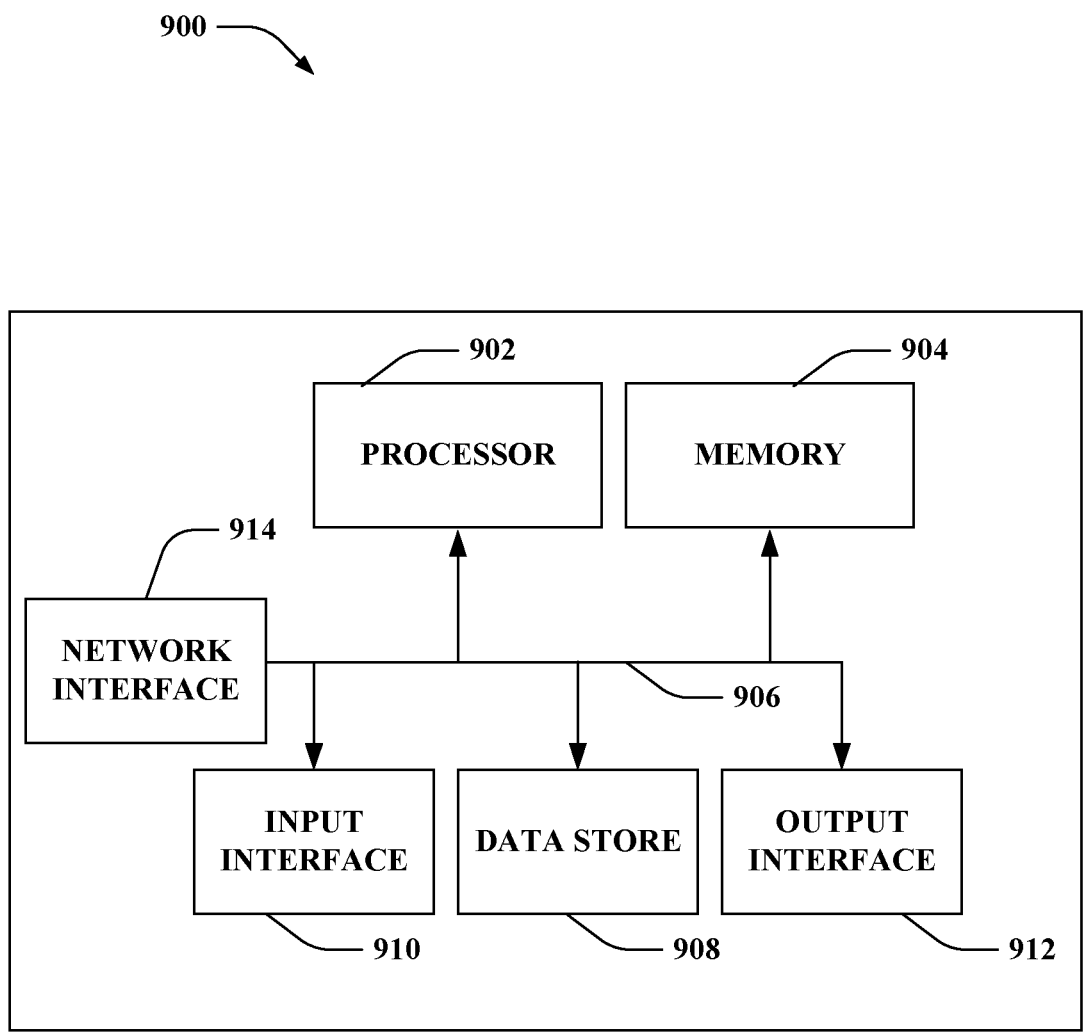
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be or include the computing system 112 or the networked computing system 130. The computing device 900 includes at least one processor 902 that executes instructions that are stored in a memory 904. The instructions may be, for instance, instructions for implementing functionality described as being carried out by one or more systems discussed above or instructions for implementing one or more of the methods described above.

The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store bids, occupancy grid movie(s), occupancy grids, cached query objects, predicted objects, accumulated occupancy grid(s), and so forth.

The computing device 900 additionally includes a data store 908 that is accessible by the processor 902 by way of the system bus 906. The data store 908 may include executable instructions, bids, prior occupancy grids, predicted objects, ignored static objects, accumulated occupancy grids, etc.

The computing device 900 also includes an input interface 910 that allows inputs from a user to be received as instructions.

The computing device 900 also includes a network interface 914 that interfaces with a network. The network may include multiple computing devices in communication with on another. Network interface 914 may use various wired and wireless connection protocols such as, direct connect, Ethernet, Bluetooth®, IEEE 1394a-b, serial, universal serial bus (USB), Digital Visual Interface (DVI), 802.11a/b/g/n/x, cellular, miracast, and the like.

The network interface 914 allows external devices to communicate with the computing device 900. For instance, the input interface 910 may be used to receive instructions from an external computer device, etc. The network interface 914 creates a secure way of doing such.

The computing device 900 also includes an output interface 912 that interfaces the computing device 900 with one or more external devices. For example, the computing device 900 may transmit control signals to the vehicle propulsion system 106, the braking system 108, and/or the steering system 110 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable non-transitory medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
sensor systems that generate sensor signals, wherein the sensor signals are indicative of a driving environment of the autonomous vehicle, wherein the driving environment includes an intersection; and
a computing system that is in communication with the sensor systems, wherein the computing system comprises:
a processor; and
memory that stores computer-executable instructions that, when executed by the processor, cause the processor to perform acts comprising:
detecting an occluded area in the driving environment proximate to the intersection from a perspective of the autonomous vehicle based on the sensor signals;
receiving disparate sensor signals from a disparate autonomous vehicle, wherein the disparate sensor signals correspond to the occluded area;
detecting one or more differing vehicles proximate to the intersection based on the sensor signals and the disparate sensor signals when the autonomous vehicle is proximate to the intersection, wherein detecting the one or more differing vehicles proximate to the intersection further comprises detecting whether the one or more differing vehicles comprises at least one non-autonomous vehicle;
when the one or more differing vehicles comprises at least one non-autonomous vehicle detected as being proximate to the intersection, traversing the intersection based on a first turn order for the autonomous vehicle and the one or more differing vehicles, the first turn order being a function of times at which the autonomous vehicle and the one or more differing vehicles respectively arrive at the intersection; and
when the one or more differing vehicles comprises at least a second autonomous vehicle detected as being proximate to the intersection and lacks a non-autonomous vehicle:
generating a first bid indicative of a first importance that the autonomous vehicle traverses the intersection, wherein the first bid is based on characteristics of a trip of a passenger riding in the autonomous vehicle;
transmitting the first bid to a networked computing system, wherein the networked computing system determines a second turn order for the autonomous vehicle and the one or more differing vehicles based on at least the first bid and a second bid, wherein the second bid is generated by the second autonomous vehicle, and wherein the second bid is indicative of a second importance that the second autonomous vehicle traverses the intersection;
receiving the second turn order from the networked computing system; and
traversing the intersection based on the second turn order.

2. The autonomous vehicle of claim 1, wherein the characteristics of the trip of the passenger riding in the autonomous vehicle include at least one of: an intended path creating a shortest distance of the trip, a priority of the autonomous vehicle, a priority of the passenger, an amount of idle time of the autonomous vehicle at the intersection, ride quality experienced by the passenger, a total time of the trip of the passenger, an expected arrival time of the autonomous vehicle at a destination, previous approval ratings of an autonomous vehicle service responsible for the autonomous vehicle, fuel consumption of the autonomous vehicle, energy consumption of the autonomous vehicle, remaining distance left for the autonomous vehicle to travel on the trip, time remaining in the trip, or a type of the trip.

3. The autonomous vehicle of claim 2, wherein each characteristic in the characteristics is assigned a respective weight, wherein the computing system generates a score that is indicative of the first importance that the autonomous vehicle traverses the intersection based on the characteristics as weighted.

4. The autonomous vehicle of claim 1, wherein the networked computing system determines that a first future path of the autonomous vehicle and a second future path of the second autonomous vehicle are non-intersecting, wherein the second turn order indicates that the autonomous vehicle and the second autonomous vehicle are to concurrently traverse the intersection.

5. The autonomous vehicle of claim 1, the acts further comprising:
directly communicating with the second autonomous vehicle prior to traversing the intersection based on the second turn order.

6. The autonomous vehicle of claim 1, wherein the networked computing system determines that the first importance is less than the second importance, wherein the second turn order indicates that the autonomous vehicle is to traverse the intersection subsequent to the second autonomous vehicle traversing the intersection, wherein traversing the intersection based on the second turn order comprises causing the autonomous vehicle to traverse the intersection subsequent to the second autonomous vehicle traversing the intersection.

7. The autonomous vehicle of claim 1, wherein the networked computing system determines that the first importance is greater than the second importance, wherein the second turn order indicates that the autonomous vehicle is to traverse the intersection prior to the second autonomous vehicle traversing the intersection, wherein traversing the intersection based on the second turn order comprises causing the autonomous vehicle to traverse the intersection prior to the second autonomous vehicle traversing the intersection.

8. The autonomous vehicle of claim 1, wherein the autonomous vehicle belongs to a first autonomous vehicle fleet that is maintained by a first autonomous vehicle service, wherein the second autonomous vehicle belongs to a second autonomous vehicle fleet that is maintained by a second autonomous vehicle service.

9. The autonomous vehicle of claim 1, wherein the autonomous vehicle arrives at the intersection subsequent to the second autonomous vehicle arriving at the intersection, wherein the networked computing system determines that the first importance is greater than the second importance, wherein the second turn order indicates that the autonomous vehicle is to traverse the intersection prior to the second autonomous vehicle traversing the intersection.

10. The autonomous vehicle of claim 1, wherein the first bid comprises a first location of the autonomous vehicle in the driving environment, wherein the second bid comprises a second location of the second autonomous vehicle in the driving environment, wherein the networked computing system determines that the autonomous vehicle and the second autonomous vehicle are proximate to the intersection based on the first bid, a first time at which the networked computing system receives the first bid, the second bid, and a second time at which the networked computing system receives the second bid.

11. The autonomous vehicle of claim 1, the acts further comprising:
responsive to detecting the occluded area, transmitting a request for the disparate sensor signals corresponding to the occluded area, wherein the request for the disparate sensor signals corresponding to the occluded area is transmitted to the networked computing system, and wherein the networked computing system selects the disparate autonomous vehicle to provide the disparate sensor signals corresponding to the occluded area.

12. The autonomous vehicle of claim 1, wherein the autonomous vehicle is inhibited from transmitting the first bid to the networked computing system when the one or more differing vehicles comprises at least one non-autonomous vehicle.

13. A method performed by a processor of a networked computing system, the method comprising:
receiving a first bid generated by a first autonomous vehicle, wherein the first bid is indicative of a first importance that the first autonomous vehicle traverses an intersection, wherein the first bid is based on first characteristics of a first trip of a first passenger riding in the first autonomous vehicle, and wherein the first bid comprises a first indication specifying whether a non-autonomous vehicle is detected by the first autonomous vehicle as being within proximity of the intersection;
receiving a second bid generated by a second autonomous vehicle, wherein the second bid is indicative of a second importance that the second autonomous vehicle traverses the intersection, wherein the second bid is based on second characteristics of a second trip of a second passenger riding in the second autonomous vehicle, and wherein the second bid comprises a second indication specifying whether a non-autonomous vehicle is detected by the second autonomous vehicle as being within proximity of the intersection;
determining that the first autonomous vehicle and the second autonomous vehicle are both within proximity of the intersection based on the first bid and the second bid;
determining whether a non-autonomous vehicle is within proximity of the intersection based on the first indication included in the first bid from the first autonomous vehicle and the second indication included in the second bid from the second autonomous vehicle;
when a non-autonomous vehicle is within proximity of the intersection:
determining a first turn order for the first autonomous vehicle, the second autonomous vehicle, and the non-autonomous vehicle based on respective arrival times within proximity of the intersection; and
transmitting the first turn order to the first autonomous vehicle and the second autonomous vehicle, wherein the first autonomous vehicle and the second autonomous vehicle operate based on the first turn order; and
when a non-autonomous vehicle is not within proximity of the intersection:
determining a second turn order for the first autonomous vehicle and the second autonomous vehicle at the intersection based on the first bid and the second bid, wherein the second turn order indicates that the first autonomous vehicle is to traverse the intersection prior to the second autonomous vehicle traversing the intersection or that the first autonomous vehicle is to traverse the intersection subsequent to the second autonomous vehicle traversing the intersection; and
transmitting the second turn order to the first autonomous vehicle and the second autonomous vehicle, wherein the first autonomous vehicle and the second autonomous vehicle operate based on the second turn order.

14. The method of claim 13, wherein the first autonomous vehicle arrives at the intersection subsequent to the second autonomous vehicle arriving at the intersection, wherein the networked computing system determines that the first importance is greater than the second importance, and wherein the second turn order indicates that the first autonomous vehicle is to traverse the intersection prior to the second autonomous vehicle traversing the intersection.

15. The method of claim 13, wherein the first autonomous vehicle belongs to a first autonomous vehicle fleet that is maintained by a first autonomous vehicle service, wherein the second autonomous vehicle belongs to a second autonomous vehicle fleet that is maintained by a second autonomous vehicle service.

16. The method of claim 13, wherein the first characteristics include at least one of: a first intended path creating a shortest distance of the first trip, a priority of the first autonomous vehicle, a first priority of the first passenger, a first amount of idle time of the first autonomous vehicle at the intersection, a ride quality experienced by the first passenger, a total time of the first trip of the first passenger, an expected arrival time of the first autonomous vehicle at a first destination of the first trip, previous approval ratings of a first autonomous vehicle service responsible for the first autonomous vehicle, fuel consumption of the first autonomous vehicle, energy consumption of the first autonomous vehicle, remaining distance left for the first autonomous vehicle to travel on the first trip, time remaining in the first trip, or a type of the first trip, wherein the second characteristics include at least one of: a second intended path creating a shortest distance of the second trip, a priority of the second autonomous vehicle, a second priority of the second passenger, a second amount of idle time of the second autonomous vehicle at the intersection, a ride quality experienced by the second passenger, a total time of the second trip of the second passenger, an expected arrival time of the second autonomous vehicle at a second destination of the second trip, previous approval ratings of a second autonomous vehicle service responsible for the second autonomous vehicle, fuel consumption of the second autonomous vehicle, energy consumption of the second autonomous vehicle, remaining distance left for the second autonomous vehicle to travel on the second trip, time remaining in the second trip, or a type of the second trip.

17. The method of claim 13, further comprising:

receiving, from the first autonomous vehicle, a request for sensor signals corresponding to an occluded area, wherein the occluded area is proximate to the intersection and is occluded from a perspective of the first autonomous vehicle;

selecting a disparate autonomous vehicle to provide the sensor signals corresponding to the occluded area to the first autonomous vehicle, the disparate autonomous vehicle being one of the second autonomous vehicle or a third autonomous vehicle; and causing the disparate autonomous vehicle to provide the sensor signals corresponding to the occluded area to the first autonomous vehicle.

18. A method performed by an autonomous vehicle, comprising:

detecting an occluded area in a driving environment proximate to an intersection from a perspective of the autonomous vehicle based on sensor signals generated by sensor systems of the autonomous vehicle;

receiving disparate sensor signals from a disparate autonomous vehicle, wherein the disparate sensor signals correspond to the occluded area;

detecting one or more differing vehicles proximate to the intersection based on the sensor signals and the disparate sensor signals when the autonomous vehicle is proximate to the intersection, wherein detecting the one or more differing vehicles proximate to the intersection further comprises detecting whether the one or more differing vehicles comprises at least one non-autonomous vehicle;

when the one or more differing vehicles comprises at least one non-autonomous vehicle detected as being proximate to the intersection, traversing the intersection based on a first turn order for the autonomous vehicle and the one or more differing vehicles, the first turn order being a function of times at which the autonomous vehicle and the one or more differing vehicles respectively arrive at the intersection; and when the one or more differing vehicles comprises at least a second autonomous vehicle detected as being proximate to the intersection and lacks a non-autonomous vehicle:

generating a first bid indicative of a first importance that the autonomous vehicle traverses the intersection, wherein the first bid is based on characteristics of a trip of a passenger riding in the autonomous vehicle;

transmitting the first bid to a networked computing system, wherein the networked computing system determines a second turn order for the autonomous vehicle and the one or more differing vehicles based on at least the first bid and a second bid, wherein the second bid is generated by the second autonomous vehicle, and wherein the second bid is indicative of a second importance that the second autonomous vehicle traverses the intersection;

receiving the second turn order from the networked computing system; and traversing the intersection based on the second turn order.

19. The method of claim 18, wherein the characteristics of the trip of the passenger riding in the autonomous vehicle include at least one of: an intended path creating a shortest distance of the trip, a priority of the autonomous vehicle, a priority of the passenger, an amount of idle time of the autonomous vehicle at the intersection, ride quality experienced by the passenger, a total time of the trip of the passenger, an expected arrival time of the autonomous vehicle at a destination, previous approval ratings of an autonomous vehicle service responsible for the autonomous vehicle, fuel consumption of the autonomous vehicle, energy consumption of the autonomous vehicle, remaining distance left for the autonomous vehicle to travel on the trip, time remaining in the trip, or a type of the trip.

20. The method of claim 18, wherein the networked computing system determines that a first future path of the autonomous vehicle and a second future path of the second autonomous vehicle are non-intersecting, wherein the second turn order indicates that the autonomous vehicle and the second autonomous vehicle are to concurrently traverse the intersection.

* * * * *